US012673324B2

(12) United States Patent
Fobel et al.

(10) Patent No.: US 12,673,324 B2
(45) Date of Patent: Jul. 7, 2026

(54) SURFACTANT ADDITIVES FOR DIGITAL MICROFLUIDIC DEVICES FOR HIGH PROTEIN CONTENT DROPLETS TRANSPORT

(71) Applicant: THE GOVERNING COUNCIL OF THE UNIVERSITY OF TORONTO, Toronto (CA)

(72) Inventors: Ryan Fobel, Toronto (CA); Alphonsus Hon-Chung Ng, North York (CA); Aaron Ray Wheeler, Toronto (CA); Man Ho Stephen Ho, North York (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 1054 days.

(21) Appl. No.: 17/699,268

(22) Filed: Mar. 21, 2022

(65) Prior Publication Data

US 2022/0288592 A1 Sep. 15, 2022

Related U.S. Application Data

(63) Continuation of application No. 16/092,273, filed as application No. PCT/CA2017/050398 on Mar. 31, 2017, now Pat. No. 11,292,002.

(Continued)

(51) Int. Cl.

*B01L 3/00* (2006.01)
*C09D 5/00* (2006.01)
*C09D 5/16* (2006.01)

(52) U.S. Cl.

CPC ........ *B01L 3/502792* (2013.01); *C09D 5/008* (2013.01); *C09D 5/1662* (2013.01); *B01L 3/502715* (2013.01); *B01L 2300/165* (2013.01)

(58) Field of Classification Search

CPC ................................................ B01L 3/502792

(Continued)

(56) References Cited

U.S. PATENT DOCUMENTS

| | | | |
|---|---|---|---|
| 4,894,253 | A | 1/1990 | Heineman et al. |
| 5,075,400 | A | 12/1991 | Andrade et al. |

(Continued)

FOREIGN PATENT DOCUMENTS

| | | | |
|---|---|---|---|
| CN | 1441042 | A | 9/2003 |
| CN | 1867407 | A | 11/2006 |

(Continued)

OTHER PUBLICATIONS

Anderson, N. L. & Anderson, N. G., The human plasma proteome, history, character, and diagnostic prospects. Molecular & cellular proteomics : MCP 1, 845-867 (2002).

(Continued)

*Primary Examiner* — Lyle Alexander
*Assistant Examiner* — Emily R. Berkeley
(74) *Attorney, Agent, or Firm* — HILL & SCHUMACHER

(57) ABSTRACT

Disclosed herein is a surfactant additive, ethylenediamine tetrakis(ethoxylate-block-propoxylate) tetrol with 16 ethylene oxide repeat units and 18 propylene oxide repeat units (known by its trade name as Tetronic 90R4) used as a droplet-additive, or to coat DMF driving electrode surfaces which dramatically improves the capability to work with high-protein-content liquids (e.g., whole blood) on digital microfluidic chips. This surfactant prevents protein adsorption and fouling of DMF electrode surfaces to an extent that was heretofore impossible. Specifically, this surfactant allows for the manipulation of droplets of undiluted whole blood for >1 hour per electrode (>1 50 times better than what is possible for any known additive). This improvement in (Continued)

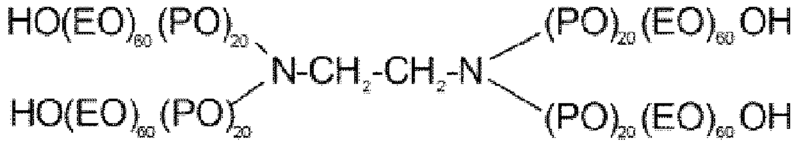

$M_w = 15000\ g{\cdot}mol^{-1}$ $M_w = 7200\ g{\cdot}mol^{-1}$ handling high protein content media will revolutionize blood-based diagnostics on digital microfluidic platforms.

4 Claims, 8 Drawing Sheets

Related U.S. Application Data

(60) Provisional application No. 62/320,079, filed on Apr. 8, 2016.

(58) Field of Classification Search
USPC .......................................................... 422/504
See application file for complete search history.

(56) References Cited

U.S. PATENT DOCUMENTS

| | | | |
|---|---|---|---|
| 2005/0161644 | A1 | 7/2005 | Zhang et al. |
| 2005/0173682 | A1 | 8/2005 | Zhang et al. |
| 2011/0180571 | A1 | 7/2011 | Srinivasan et al. |

FOREIGN PATENT DOCUMENTS

| | | | |
|---|---|---|---|
| CN | 101430509 | A | 5/2009 |
| CN | 105008052 | A | 10/2015 |
| JP | 200319859 | A | 1/2003 |
| WO | 9823712 | A3 | 6/1998 |
| WO | 03106522 | A1 | 12/2003 |
| WO | 2005039770 | A1 | 5/2005 |
| WO | 2009021173 | A1 | 2/2009 |
| WO | 2009021173 | A9 | 2/2009 |
| WO | 2014135232 | A1 | 9/2014 |

OTHER PUBLICATIONS

Blaszykowski, C., Sheikh, S. & Thompson, M., Surface chemistry to minimize fouling from blood-based fluids, Chem. Soc. Rev. 41, 5599-5612 (2012).

Jordan , C. D., Flood , J. G., Laposata , M. & Lewandrowski , K. B., case records of the Massachusetts General Hospital, Normal Reference Laboratory Values. N. Engl. J. Med. 327, 718-724 (1992).

Leslie, D. C. et al., A bioinspired omniphobic surface coating on medical devices prevents thrombosis and biofouling, Nat Biotech 32, 1134-1140 (2014).

Ng, A. H. C., Uddayasankar, U. & Wheeler, A. R., Immunoassays in microfluidic systems, Anal. Bioanal. Chem. 397, 991-1007 (2010).

Ng, A. H. C. et al., Digital Microfluidic Platform for the Detection of Rubella Infection and Immunity: A Proof of Concept, Clin. Chem. (2015). pp. 420-429.

Sista, R. S. et al. Digital Microfluidic Platform for Multiplexing Enzyme Assays: Implications for Lysosomal Storage Disease Screening in Newborns. Clin. Chem. 57, 1444-1451 (2011).

Mousa, N. A. et al. Droplet-Scale Estrogen Assays in Breast Tissue, Blood, and Serum. Sci. Transl. Med. 1, 1ra2-1ra2 (2009). pp. 1-6.

Ng, A. H. C., Li, B. B., Chamberlain, M. D. & Wheeler, A. R. Digital Microfluidic Cell Culture. Annu. Rev. Biomed. Eng. 17, 91-112 (2015).

Luk, V. N., Mo, G. C. & Wheeler, A. R. Pluronic additives: A solution to sticky problems in digital microfluidics. Langmuir 24, 6382-6389 (2008).

Yoon, J. Y. & Garrell, R. L. Preventing biomolecular adsorption in electrowetting-based biofluidic chips. Anal. Chem. 75, 5097-5102 (2003).

Srinivasan, V., Pamula, V. K. & Fair, R. B. An integrated digital microfluidic lab-on-a-chip for clinical diagnostics on human physiological fluids. Lab. Chip 4, 310-315 (2004).

Brassard, D., Malic, L., Normandin, F., Tabrizian, M. & Veres, T. Water-oil core-shell droplets for electrowetting-based digital microfluidic devices. Lab on a Chip—Miniaturisation for Chemistry and Biology 8, 1342-1349 (2008).

Amiji, M. & Park, K. Prevention of protein adsorption and platelet adhesion on surfaces by PEO/PPO/PEO triblock copolymers. Biomaterials 13, 682-692 (1992).

Au, S. H., Kumar, P. & Wheeler, A. R. A new angle on Pluronic additives: Advancing droplets and understanding in digital microfluidics. Langmuir 27, 8586-8594 (2011).

Hung, P.-Y., Jiang, P.-S., Lee, E.-F., Fan, S.-K. & Lu, Y.-W. Genomic DNA extraction from whole blood using a digital microfluidic (DMF) platform with magnetic beads. Microsystem Technologies, 1-8 (2015).

Chen, Y. et al. Aggregation behavior of X-shaped branched block copolymers at the air/water interface: effect of block sequence and temperature. Colloid and Polymer Science 293, 97-107 (2014).

Ng, A. H. C., Choi, K., Luoma, R. P., Robinson, J. M. & Wheeler, A. R. Digital Microfluidic Magnetic Separation for Particle-Based Immunoassays. Anal. Chem. 84, 8805-8812 (2012).

Fobel, R., Fobel, C. & Wheeler, A. R. DropBot: An open-source digital microfluidic control system with precise control of electrostatic driving force and instantaneous drop velocity measurement. Applied Physics Letters 102, 193513 (2013).

Gonzalez-Lopez et al., "Self-Associative Behavior and Drug Solubilizing Ability of Poloxamine (Tetronic) Block Copolymers", Langmuir, vol. 24, No. 19, Oct. 7, 2008 (Oct. 7, 2008), pp. 10688-10697, XP055448875, US ISSN: 0743-7463, DOI: 10.1021/la801656.3.

Sarvothaman, M K. et al.; Dynamic Fluoroalkyl Polyethylene Glycol Co-Polymers : A New Strategy for Reducing Protein Adhesion in Lab-on-a-Chip Devices; Adv. Funct. Mater. (2015), 25, 506-15.

Friere, S. L. S.; Perspectives on Digital Microfluidics; Sensors and Actuators A: Physical (2016), 250, 15-28.

Pavey et al., "SPR Analysis of the Total Reduction of Protein Adsorption To Surfaces Coated With Mixtures of Long-and Short-Chain Polyethylene Oxide Block Copolymyers", Biomaterials, Elsevier Science Publishers BV., Barking, GB, vol. 20, Jan. 1, 1999 (Jan. 1, 1999) pp. 885-890, XP002941783, ISSN: 0142-9612, DOI: 10.1016/S0142-9612(98)00245-2.

Seale, Lam, Rackus, Chamberlain, Liu & Wheeler; Digital Microfluidics for Immunoprecipitation. Anal. Chem. 88, 10223-10230 (2016).

International Search Report and Written Opinion, PCT/CA2017/050398, dated Aug. 1, 2017.

$M_w = 15000\ g \cdot mol^{-1}$ $M_w = 7200\ g \cdot mol^{-1}$ a

*X and Y can be replaced with one or more of the following:
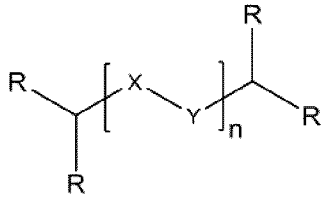
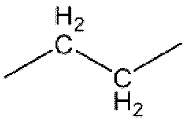
I
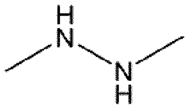
II
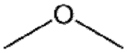
III
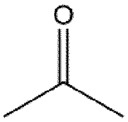
IV
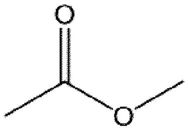
V
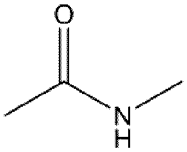
VI
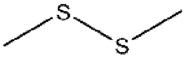
VII
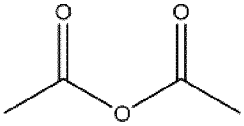
VIII
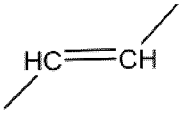
IX
Figure 3B1

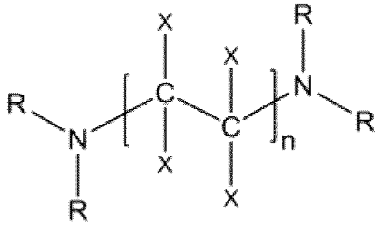
*X can be replaced with one or more of the following:
i
ii
iii
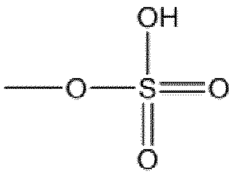
iv
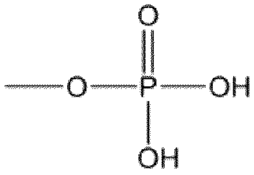
v
Figure 3B2

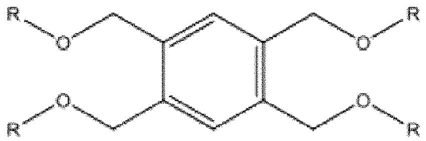
Figure 3B3
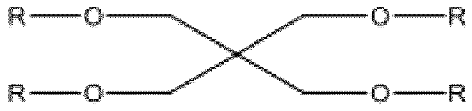
Figure 3B4
c More than four R groups:
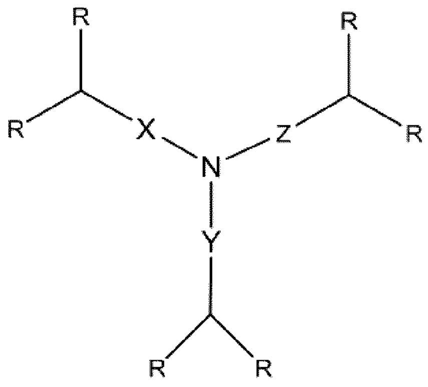
Figure 3C1
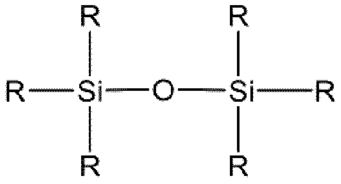
Figure 3C2

SURFACTANT ADDITIVES FOR DIGITAL MICROFLUIDIC DEVICES FOR HIGH PROTEIN CONTENT DROPLETS TRANSPORT

FIELD

The present disclosure relates to the use of amphiphilic molecular structures that when included as an additive to droplets manipulated by digital microfluidics, prevents protein adsorption to an extent that was heretofore impossible. A particular surfactant, ethylenediamine tetrakis(ethoxylate-block-propoxylate) tetrol (known as Tetronic 90R4), allows for the manipulation of droplets of undiluted whole blood for >1 hour per electrode (>150 times better than what is possible for any known additive).

BACKGROUND

Blood is the most important clinical specimen collected from the human body, with hundreds of millions of tubes drawn every year for disease diagnostics and therapeutic monitoring.[1] One long-standing problem in clinical diagnostics is the non-specific adsorption of blood proteins on the surface of analytical devices, such as implantable sensors or in vitro diagnostic platforms.[2] Even after removing the cellular components of blood, the remaining fluid (i.e., the plasma) has a large concentration of proteins (~60 $g \cdot L^{-1}$) that can hamper the performance of these devices.[3] Accordingly, chemists and materials scientists have devoted a tremendous amount of effort in the development of protein-resistant surfaces.[4,5] These materials typically include hydrophilic, uncharged functional groups [e.g. poly(ethylene oxide) (PEO) or sulfobetaine] such that a tightly bound layer of water molecules forms at the surface, hindering the adsorption of proteins.[2] However these surfaces are not a panacea for all applications, and in fact, the hydrophilicity of these materials makes them incompatible with digital microfluidics (DMF), a fluid-handling technique that has recently become popular in clinical diagnostic applications.[6-8]

In digital microfluidic (DMF) devices, samples and reagents are manipulated in the form of discrete picoliter- to microliter-sized droplets through the application of electrical potentials on a generic (m×n) array of insulated driving electrodes (FIG. 1*a*).[9] The generic geometry and simple actuation scheme of DMF allows users to implement assay protocols using a "programming" approach, calling a series of "functions" comprising various combinations of droplet operations: metering from reservoirs, splitting, merging, and mixing (FIG. 1*b*). The most versatile and prevalent device format for DMF is the two-plate configuration, in which droplets are sandwiched between two parallel substrates patterned with electrodes (FIG. 1*a*). Typically the bottom-plate houses the driving electrode array (of any conductive material) covered by an insulating dielectric layer (e.g., Parylene C, Silicon nitride, PDMS, or SU-8). These electrodes are referenced to a continuous ground electrode in the top-plate, often formed from indium tin oxide (ITO), an optically transparent conductive material. Spacers are used to separate the top and bottom plates, resulting in a fixed gap between them.

One critical requirement of DMF is that the surfaces in contact with the droplet must be coated with a fluorinated hydrophobic coating (e.g., Teflon AF® from DuPont, Cytop® from Asahi Glass, or FluoroPel® from Cytonix) to minimize the friction experienced by aqueous droplets during movement over the electrode array. The requirement of this hydrophobic layer makes the device susceptible to protein fouling. When a droplet of protein-containing solution is placed on the device, proteins begin to foul the surface, making it hydrophilic and (after enough protein molecules adsorb) unfit for droplet movement. For example, the maximum movable concentration of aqueous bovine serum albumin (BSA) in DMF is a mere 0.005 $g \cdot L^{-1}$; at concentrations greater than this level, protein adsorbs so rapidly to the dielectric layer overlaying the driving electrodes surfaces that droplets become impossible to move.[10,11] This limitation makes DMF completely inadequate for blood-based clinical diagnostic applications, in which specimens contain at least 60 $g \cdot L^{-1}$ protein.

In the past, two strategies have been developed to overcome the challenge of protein adsorption on DMF devices: (1) encapsulating droplets in a non-conductive, immiscible liquid, or (2) doping additives into the aqueous droplets themselves. In method (1), devices are filled with a low-viscosity fluid (typically silicone oil); in this configuration (Left, FIG. 1*c*), droplets (which must be immiscible with the filler) are encapsulated by a film, which prevents droplets from directly contacting the hydrophobic surface. For example, using this approach, Srinivasan et al.[12] demonstrated the successful manipulation of whole blood for up to 40 minutes, after which the authors observed performance degradation of the device.

In another variant of this approach, aqueous droplets are encapsulated in a thin oil shell and transported on a device that is predominantly filled with air (Middle,[2] FIG. 1*c*).[13] This aqueous-oil core-shell configuration lowers viscous drag and eliminates the fabrication and packaging required to confine the silicone oil in the device. However, the use of oil can bring about several drawbacks for analytical applications. First, the analyte of interest (e.g. protein or small molecule) may partition into the oil phase, which can adversely affect the assay performance and lead to cross-contamination. Second, techniques that require interactions with device surfaces, such as nucleotide hybridization or electrochemical detection, may be hindered by the oil barrier surrounding the droplet.

In the second class of techniques used to limit the effects of protein adsorption in DMF devices, an additive is included in the droplet composition to prevent proteins from interacting with the surface (Right, FIG. 1*c*). The most established additive for preventing protein adsorption in digital microfluidics is Pluronics. This family of linear triblock copolymers is amphiphilic; that is, they are formed from a relatively hydrophobic poly(propylene oxide) (PPO) chain flanked by two relatively hydrophilic poly(ethylene oxide) (PEO) chains (PEO-PPO-PEO). When dissolved in aqueous solution, amphiphilic molecules (bearing both hydrophobic and hydrophilic residues) are known to reduce protein and cell adsorption to hydrophobic surfaces; in the many different varieties of Pluronics, this property is tuned by varying the lengths of the PPO and PEO components.[14] Pluronic additives have proven invaluable as antifouling agents in the development of DMF. For example, in an early report, Luk et al.[10] demonstrated sustained movement of droplets containing up to 50 $g \cdot L^{-1}$ of BSA in oil-free devices for droplets containing low concentrations (0.08%) of Pluronic F127 (with PEO/PPO/PEO average chain length of 100/65/100), In a more systematic study, Au et al.[15] tested the suitability of a series of eight Pluronic surfactants for reduction of fouling in droplets of cell culture media (containing 10% bovine serum) on DMF devices. Consistent with previous observations,[14] the authors observed that Pluronics with longer hydrophobic PPO chains are more effective at reducing protein adsorption during droplet movement. Specifically, Pluronic molecules bearing fewer than 30 PPO units (F38, L35, and L44) failed to enable translation of droplets containing 10% fetal bovine serum (because of surface-fouling), while Pluronic molecules bearing greater than 30 PPO units (F68, L64, L62, L92, and P105) resisted fouling, and supported movement for hundreds of droplet operations.

Since these initial reports, the inclusion of Pluronic additives in reagent formulations for DMF has become nearly universal among the hundreds of scientists around the world using this promising technology. For example, Pluronic L64 has become widely used as an antifouling additive for DMF-enabled immunoassays. Unfortunately, the Pluronic-additive technique is an imperfect one, particularly for solutions containing very high concentrations of proteins (like whole blood). In fact, despite great interest in DMF applications involving blood, there are no reports of any additive that can reliably enable the manipulation of droplets of blood for longer than 1 minute per electrode.[16] This suggests that the conventional properties of hydrophilic polymer additives (ref. U.S. Pat. No. 8,481,125) is insufficient for digital microfluidic manipulation of solutions containing greater than 50 $g \cdot L^{-1}$ proteins (e.g., whole blood).

SUMMARY

Disclosed herein is surfactant additives with a unique molecular structure that dramatically improves the capability to work with high-protein-content liquids (e.g., whole blood) on digital microfluidic chips. A highly efficacious surfactant for this purpose disclosed herein is ethylenediamine tetrakis(ethoxylate-block-propoxylate) tetrol with 16 ethylene oxide repeat units and 18 propylene oxide repeat units (known by its trade name as Tetronic 90R4) and studies by the inventors have shown that this surfactant prevents protein adsorption to an extent that was heretofore impossible. Specifically, this surfactant allows for the manipulation of droplets of undiluted whole blood for >1 hour per electrode (>150 times better than what is possible for any known additive). This improvement in handling high protein content media will revolutionize blood-based diagnostics on digital microfluidic platforms. Other embodiments of surfactants with four R groups are derived from this surfactant by changing various groups. In addition, surfactants with more that four R groups are disclosed herein.

In an embodiment there is provided a method of preventing fouling of digital microfluidic electrodes while processing fluids containing proteins, comprising:

mixing or dissolving ethylenediamine tetrakis(ethoxylate-block-propoxylate) tetrol in the protein-containing fluid such that the ethylenediamine tetrakis(ethoxylate-block-propoxylate) tetrol is present in an amount from about 0.02% to 0.4% wt:wt.

There is also provided a digital microfluidic device having an array of driving electrodes, comprising:

one or more of the driving electrodes coated with ethylenediamine tetrakis(ethoxylate-block-propoxylate) tetrol by simple non-specific drying or through covalent attachment.

A further understanding of the functional and advantageous aspects of the present disclosure can be realized by reference to the following detailed description and drawings.

BRIEF DESCRIPTION OF THE DRAWINGS

Embodiments will now be described, by way of example only, with reference to the drawings, in which.

(b) is a graphical representation of a pre-programmed voltage sequence (left hand side) and corresponding frames from a video (right hand side) depicting metering of droplets from reservoirs; and (c) illustrates conventional methods for preventing protein adsorption in DMF include the oil-filled configuration (left), core-shell configuration (middle), and oil-free configuration (right) with miscible additive.

Figure 2:
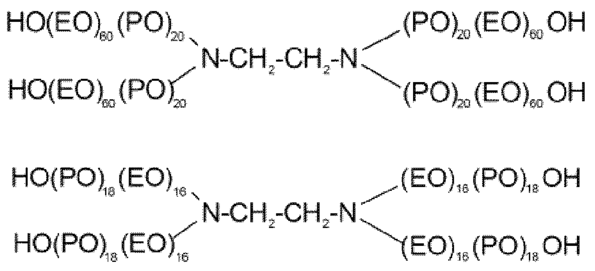

FIG. 2 shows the chemical structure and molecular weight (MW) of a "standard" Tetronic, Tetronic 1107 (top) and a "reverse" Tetronic, Tetronic 90R4 (bottom) its chemical name being ethylenediamine tetrakis(ethoxylate-block-propoxylate) tetrol.

Figure 1:
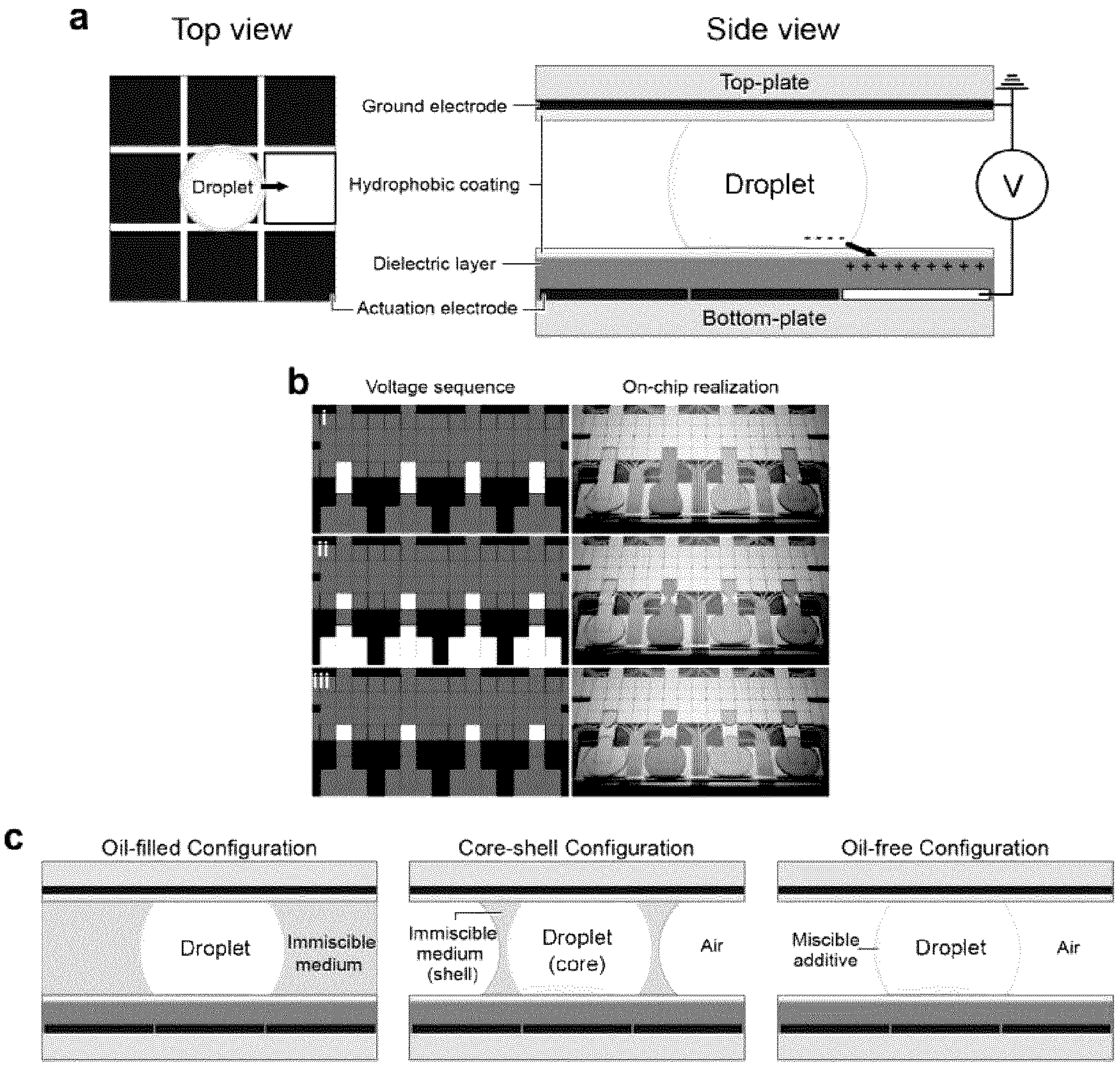
FIG. 1 shows a standard DMF device in which (a) is a top view (left hand side) and side view (right hand side) showing schematics of a two-plate DMF device.
Figure 3A:
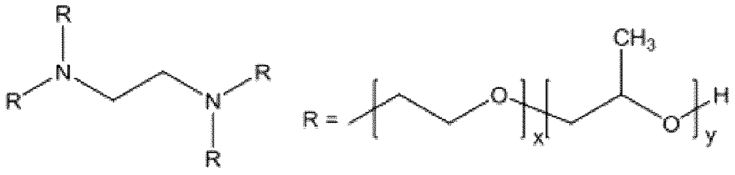
Figure 4:
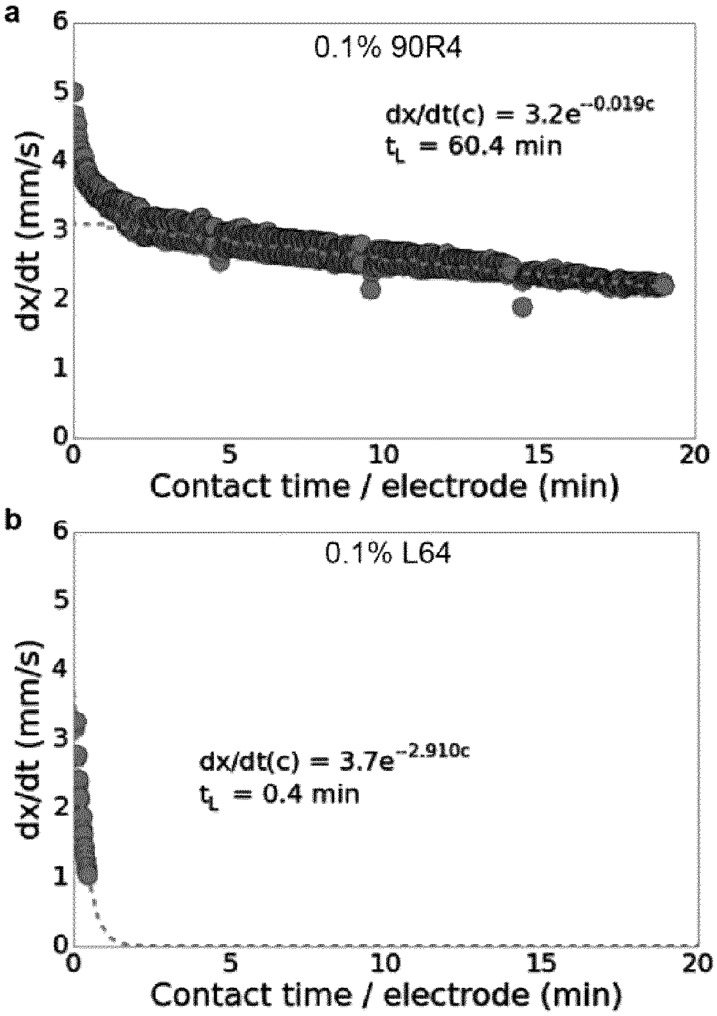

FIG. 3A shows the molecular formula of ethylenediamine tetrakis(ethoxylate-block-propoxylate) tetrol on the left hand side and the R group shown on the right hand side is x ethylene oxide repeat units and y propylene oxide repeat units, wherein x is an integer in a range from about 4 to about 32, and y is an integer in a range from about 2 to about 36;

FIG. 3B1 shows a molecular formula of another molecule on the left hand side that may be used instead of the molecular formula of FIG. 3A, in which the four R groups are the same as in the formula of FIG. 3A and X and Y can be any one of the groups shown on the right hand side labelled I to IX;

FIG. 3B2 shows a molecular formula of another molecule on the left hand side that may be used instead of the molecular formula of FIG. 3A, in which the four R groups are the same as in the formula of FIG. 3A and X can be any one of the groups shown on the right hand side labelled i to v;

FIG. 3B3 shows a molecular formula of another molecule that may be used instead of the molecular formula of FIG. 3A, in which the four R groups are the same as in the formula of FIG. 3A in which the four R groups are the same as in FIG. 3A;

FIG. 3B4 shows a molecular formula of another molecule that may be used instead of the molecular formula of FIG. 3A in which the four R groups are the same as in FIG. 3A;

FIG. 3C1 shows a molecular formula of another molecule that may be used instead of the molecular formula of FIG. 3A in which the six R groups are the same as in FIG. 3A and X, Y and Z can be any one of the groups shown on the right hand side labelled I to IX in FIG. 3B1;

FIG. 3C2 shows a molecular formula of another molecule that may be used instead of the molecular formula of FIG. 3A in which the six R groups are the same as in FIG. 3A;

FIG. 4 shows a representative velocity profile for the movement of droplets of whole blood supplemented with 0.1% Tetronic 90R4 (a) or 0.1% Pluronic L64 (b). Experimental data are plotted as gray dots; exponential fits to the data are shown as dashed lines.

Figure 5:
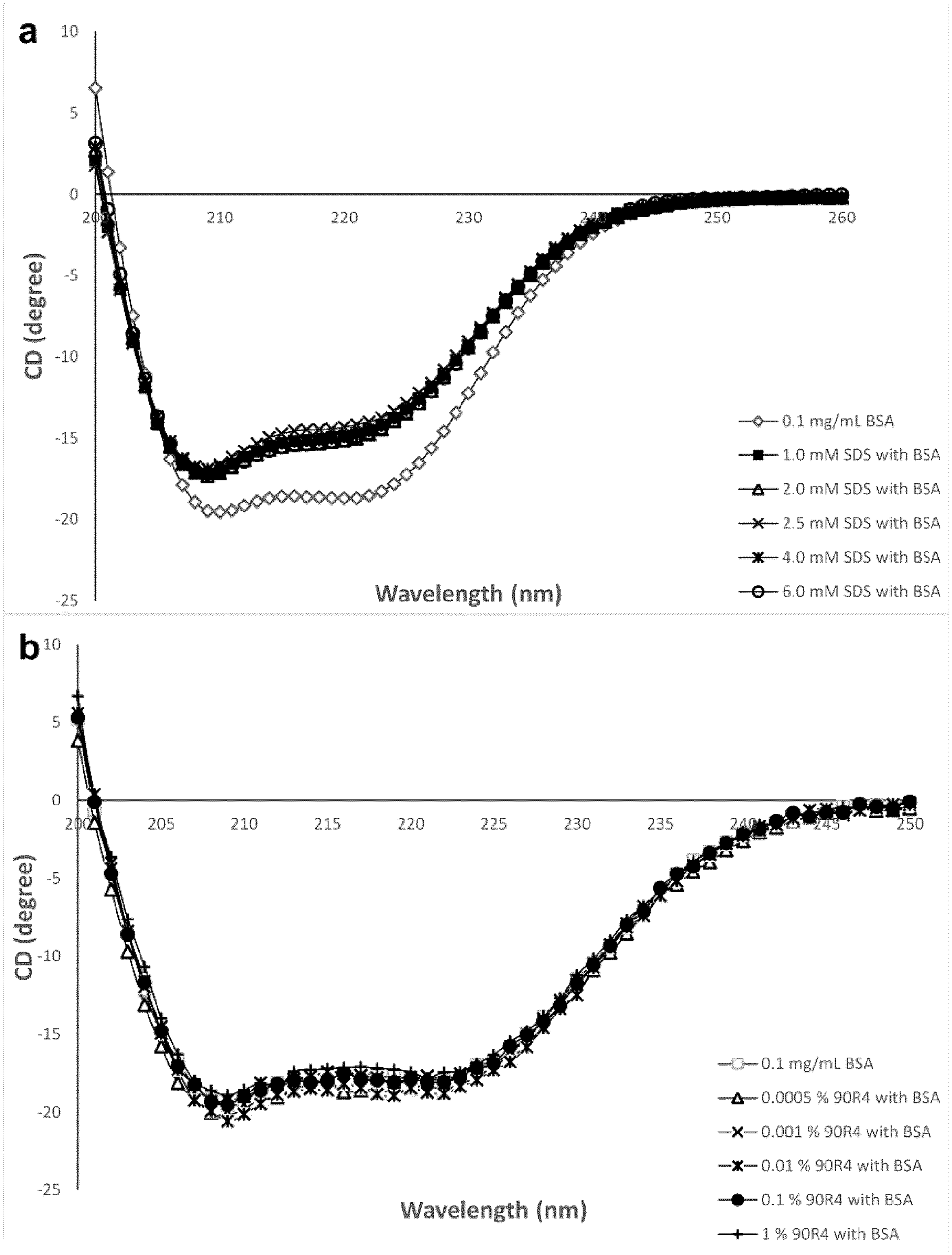

FIG. 5 shows circular dichroism (CD) spectra data of 0.1 mg/mL BSA in pH 8.0 buffer with various concentrations of sodium dodecyl sulfate (SDS) (a) or Tetronic 90R4 (b). Resolution of CD is ±0.1 degree.

Figure 6:
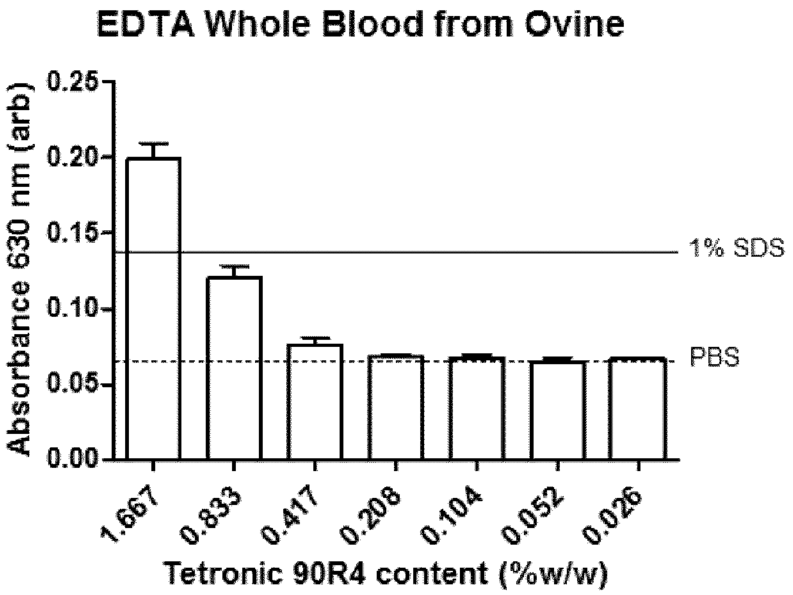

FIG. 6 shows a bar graph of absorbance of plasma extracted from whole blood supplemented with various concentrations of Tetronic 90R4 (n=3; error bars represent +/−1 S.D.). The dashed line indicates the absorbance of blood diluted with vehicle only (no hemolysis), and the solid line indicates the absorbance of blood diluted with 1% SDS (hemolysis).

DETAILED DESCRIPTION

Various embodiments and aspects of the disclosure will be described with reference to details discussed below. The following description and drawings are illustrative of the disclosure and are not to be construed as limiting the disclosure. The Figures are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

Unless defined otherwise, all technical and scientific terms used herein are intended to have the same meaning as commonly understood to one of ordinary skill in the art.

It has been discovered that the surfactant, ethylenediamine tetrakis(ethoxylate-block-propoxylate) tetrol with 16 ethylene oxide repeat units and 18 propylene oxide repeat units (known as Tetronic 90R4), allows for the manipulation of droplets of undiluted whole blood for >1 hour per electrode (>150 times better than what is possible for any known additive). This surprising discovery of the effect of Tetronic 90R4 on DMF droplet actuation arose from the inventors' search for an alternative to the Pluronics family (linear triblock copolymers) as additives to prevent biofouling (motivated by a desire to work with droplets of whole blood). This search led the inventors to study a family of amphiphilic surfactants with a different molecular structure, called Tetronics. Tetronics are widely used as anti-foaming agents, wetting agents, dispersants, thickeners, and demulsifies in industrial applications.[17] Most Tetronics are "X"-shaped branched block copolymers that have four PPO-PEO "arms" that are bound to a central ethylene diamine linker (FIG. 2, Top is an example of a typical member of this family, Tetronic 1107). Thus, similar to Pluronics, Tetronics have a relatively hydrophobic core flanked by relatively hydrophilic chains.

In initial work, the inventors screened the entire family of commercially available Tetronics (i.e., Tetronics 1107, 1301, 1304, 1307, 150R1, 304, 701, 901, 904, 908, 90R4) for their ability to reduce protein adsorption in droplets manipulated by digital microfluidics. Surprisingly, in these initial tests, the latter molecule, Tetronic 90R4 (T90R4), was the only member of the Tetronics family that was observed to perform better than the (much more standard) Pluronic additive. Interestingly, T90R4 is a "reverse" variant of Tetronics, in which the hydrophobic PPO blocks are at the flank and the PEO blocks are at the core (FIG. 2, Bottom).[17]

A wide range of Pluronic variants have proven effective at reducing the rate of protein adsorption to hydrophobic surfaces, thereby facilitating the handling of protein-rich solutions on DMF devices. These molecules share a similar structure, but differ in the length of their PEO and/or PPO chains. Similarly, the inventors expect that other Tetronic variants (especially reverse variants with PEO/PPO chain lengths similar to T90R4) will also be effective anti-fouling agents.

The general molecular formula for ethylenediamine tetrakis(ethoxylate-block-propoxylate) tetrol is shown in FIG. 3*a* and while T90R4 has x=16 and y=18, it is contemplated that variations of this structure will exhibit some efficacy similar to T90R4. For example, x is an integer and may be in a range from about 4 to about 32, and y is an integer and may be in a range from about 2 to about 36 (FIG. 3*a*). Also, x may be in a range from about 8 to about 24, and y may be in a range from about 8 to about 30. Also, x may be in a range from about 12 to about 20, and y may be in a range from about 12 to about 24. Further, x may also be in a range from about 14 to about 18, and y may be in a range from about 16 to about 20.

It will also be appreciated that the central ethylene diamine linker may be replaced or substituted by other suitable linkers, with non-limiting examples being shown in FIG. 3B1. Although the linker in T90R4 is small (short) relative to the long amphiphilic PEO/PPO side chains, its stiffness can determine the flexibility of side chains, and thereby affect the efficacy of antifouling properties. Some potential substitute linkers include, but are not limited to: (1) saturated (i.e., no double bonds) linear carbon-hydrogen chains of varying length (FIG. 3B1 (structure I), e.g., methyl, ethyl, propyl, butyl, pentyl), in this case, the carbons at either end bridge to the four legs of the molecule, (2) any of the above with one or more amine groups in series (FIG. 3B1 structure II), (3) any of the above with one or more ether groups (—C—O—C—) in series (FIG. 3B1 structure III), (4) any of the above with one or more ketone groups (—CO—C—) in series (FIG. 3B1 structure IV), (5) any of the above with one or more ester groups (—CO—O—C—) in series (FIG. 3B1 structure V), (6) any of the above with one or more amide groups (—CO—NH—) in series (FIG. 3B1 structure VI), (7) any of the above with one or more disulfide groups (—S—S—) in series (FIG. 3B1 structure VII), (8) any of the above with one or more acid anhydride groups (—CO—O—CO—) in series (FIG. 3B1 structure VIII), (9) any of the above with one or more double bonds in series (—C═C—, FIG. 3B1 structure IX), (10) any of the above where the hydrogens are replaced with other side-groups, such fluorine, chlorine, sulfate, and phosphate (FIG. 3B2 structure i-v), (11) 1,2,4,5-bezenetetramethanol (FIG. 3CI) (12) 2,2-bis(hydroxymethyl)1,3-propanediol (FIG. 3C2).

While four (4) elongated arms (PEO and PPO) are used above in FIGS. 3A, 3B1, 3B2, 3B3 and 3B4, it will also be appreciated that more than four (4) arms may also be used with an appropriate central linker. For example, a central amine connecting to any three (3) of the linkers shown in FIG. 3B1, in this case the carbons at the three ends bridge to a total of six (6) arms, with a non-limiting example shown in FIG. 3C1. Other variants might include PEO/PPO arms with hydrogens replaced with other side-groups shown in FIG. 3B2, and siloxane core linking up to six (6) arms shown in FIG. 3C2.

While the most common method for adding the surfactants to protein-containing solutions involves simply mixing the reagents (or dissolving the surfactant-additives) prior to loading them onto the DMF chip, several alternatives procedures may be used instead. These include, but are not limited to, pre-drying the presently disclosed surfactants onto the DMF device surface, either in pre-determined spots or coated across the entire device surface, such that when liquids come into contact with the dried surfactant, it becomes solubilized. Such methods may be especially attractive for producing DMF chips that support the addition of biological samples directly (e.g., from a finger prick), without any additional sample treatment.

In a head-to-head comparison of Tetronic 90R4 and Pluronic L64, a surfactant that is commonly used in digital microfluidic immunoassays,[18] the inventors tested their ability to manipulate droplets of ovine whole blood-EDTA (supplemented with 0.1% of T90R4 or L64) on a Teflon-Parylene C-coated digital microfluidic device (FIG. 4). In each experiment, a force of 20 $\mu N \cdot mm^{-1}$ was applied to move a 1 μL droplet between a pair of electrodes for up to 40 minutes (equivalent to 20 minutes per electrode). During each experiment, the velocity of the droplet was monitored via impedance tracking.[19] As expected (from previous experience), L64-supplemented droplets of blood were only capable of moving for a short period of time before the device became irreversibly fouled. In contrast, T90R4-supplemented droplets were able to complete the full experiment. Extrapolating the velocity profile with a decaying exponential function and defining $t_L$ (device lifetime) as the time at which droplet speed (dx/dt) falls to 1 $mm \cdot s^{-1}$, the inventors observed that the device lifetime of the T90R4 is ~150 times longer than the L64 (60.4 vs 0.4 min). This is an extraordinary result, representing the difference between being able to implement immunoassays in whole blood (for droplets supplemented with Tetronic 90R4) or not (for droplets supplemented with Pluronic L64), which is a significant leap over the teachings of U.S. Pat. No. 8,481,125.

In on-going experiments, the trend shown in FIG. 4, in which droplets containing aqueous solutions of high protein concentrations are moveable for long periods of time when supplemented with Tetronic 90R4, but are not movable (or are only movable for a very short period of time) when supplemented with various Pluronics or other (non-"reverse" or "standard") Tetronics, has been reproduced many times (data not shown). The inventors propose that this method will be invaluable for increasing device lifetime for any protein-rich solution, including (but not limited to) whole blood, serum, plasma, cell culture media, tissue extract, saliva, cerebrospinal fluid, amniotic fluid, sweat, tears, sebum, urine and more.

Thus, without being bound by any theory, the inventors hypothesize that two general phenomena may be involved in the reduction of biofouling. First (1), T90R4 unimers are thought to reduce protein adsorption to device surfaces by complexation with protein molecules (either as micelles or simply by the interaction of one or more surfactant molecules with a protein molecule) such that the protein molecule becomes "coated" and is thus unable to adsorb onto the surface. Second (2), T90R4 unimers are thought to reduce protein adsorption to devices surface by forming a contiguous, adsorbed layer at the interface, thus "shielding" the surface from protein molecules in solution. The inventors collected two data sets (outlined in the following paragraphs), suggesting that phenomenon 2 (i.e. shielding at the interface) is likely the major contributor in the reduction of biofouling.

In the first data set, the inventors observed that the molecular arrangement of a protein is unchanged by the presence of T90R4, suggesting that phenomenon 1 (i.e. surfactant-protein complexation) is unlikely. Surfactant-protein complexation is often associated with molecular rearrangement of the protein (i.e., change in protein conformation). For example, when the protein bovine serum albumin (BSA) is mixed with the surfactant sodium dodecyl sulfate (SDS), the two species are known to form a molecular complex, which results in a change in conformation of BSA. Protein conformation changes can be probed using circular dichroism (CD) experiments, as illustrated in FIG. 5. In FIG. 5*a*, the spectrum of 0.1 $g \cdot L^{-1}$ BSA (with no SDS) has a distinctly different CD spectrum from the spectra of 0.1 $g \cdot L^{-1}$ BSA mixed with 1, 2, 2.5, 4, or 6 mM SDS [note that this concentration range was selected to extend above and below the critical aggregation concentration (CAC) and the critical micelle concentration (CMC) for SDS in PBS with BSA, respectively]. In contrast, in FIG. 5*b*, the spectrum of 0.1 mg/mL BSA (with no T90R4) has a nearly identical CD spectrum to those generated from of 0.1 mg/mL BSA mixed with 0.0005%, 0.001%, 0.01%, 0.1% or 1% T90R4 (w/vol) (note that this concentration range was selected to extend above and below the CAC and CMC for T90R4 in PBS with BSA, respectively). These data suggest that there is no complexation between BSA and T90R4 or, if there is, that the protein confirmation is unaffected.

In the second data set, the inventors observed that a low molar ratio of surfactant to protein (less than 1:10) is sufficient for antifouling and that maintaining a constant ratio does not yield the same droplet movement performance in digital microfluidics, again suggesting that phenomenon 1 (surfactant-protein complexion) is unlikely. If protein molecules are prevented from adsorbing to device surfaces by forming complexes with surfactant molecules, one would first expect the molar ratio of the two species be at least 1:1 (surfactant:protein). In this case, one might further surmise that if a given ratio is determined to reduce fouling, this ratio would have similar effects even if the absolute concentrations of species changes (e.g., 10 mM surfactant and 1 mM protein should behave the same as 100 mM surfactant and 10 mM protein). Preliminary experiments with droplet manipulation on DMF devices do not support this idea. [In this study, "movement" is proxy for reduced fouling, as droplets are known to move readily across a pristine Teflon-AF surface. Likewise, "no movement" is proxy for increased fouling, as droplets are known to become "stuck" on surfaces that have been fouled with adsorbed protein. Also, to ensure that at least one "no movement" result is observed, the concentration of T90R4 was chosen to be at least 10 times lower than the concentration required to move whole blood (0.1% wt/vol).] As shown in Table 1, droplets formed from five different combinations of T90R4 and BSA (at varying concentrations) were evaluated for their capacity to move at 1 mm/s on a DMF device. Interestingly, the three conditions with the same molar ratio of 1:22.4 yielded different results. Most importantly, although all of these conditions have molar ratios well below 1:1 (surfactant: protein), two of the conditions result in robust droplet movement.

TABLE 1

Results of droplet movement experiments on DM devices.

| Concentration of T90R4 (% w/vol) | Concentration of BSA (mg/mL) | Molar ratio (T90R4:BSA) | Droplet movement (>1 mm/s) |
|---|---|---|---|
| 0.0010 | 1.0 | 1:11.2 | Yes |
| 0.0005 | 1.0 | 1:22.4 | No |
| 0.0010 | 2.0 | 1:22.4 | No |
| 0.0100 | 20.0 | 1:22.4 | Yes |
| 0.0100 | 42.6 | 1:47.7 | No |

Based on the data above, the inventors hypothesize that T90R4 primarily reduces surface fouling by forming a contiguous, shielding layer at the interface and that two features (outlined in the following paragraph) are necessary for the superior performance of the T90R4 variant. It seems likely that the combination of these two features combines to produce a uniquely structured 3D organization of PEO/PPO block co-polymer chains at the liquid/surface interface and that this structure is particularly effective at preventing the interaction of proteins with the hydrophobic surface.

Thus, without being bound by any theory, the inventors hypothesize that the unique properties observed for Tetronic 90R4 are related to its molecular structure: (1) its X-structure (T90R4 is superior to all known Pluronic variants, which have a linear tri-block structure), and (2) the relative position of the PEO and PPO blocks (the reverse variant T90R4, in which the PPO blocks flank the PEO blocks, has far superior performance to the normal T904 variant). It is believed that this "reverse" orientation of T90R4 likely allows the molecules to form a highly ordered layer at the solid-liquid interface. The structural organization of these surfactant molecules at the liquid/surface interface seems to be particularly effective for preventing proteins from interacting with the hydrophobic surface. Thus, it seems likely that the combination of these two features combines to produce a uniquely structured 3D organization of PEO/PPO block co-polymer chains at the liquid/surface interface and that this structure is particularly effective at preventing the interaction of proteins with the hydrophobic surface.

Because there are only two commercially available "reverse" variants (Tetronic 90R4 and 150R1), it is difficult to predict whether or not T90R4 represents a global optimum for the prevention of protein adsorption; however, it is contemplated that if one were to synthesize 70R4, 110R4, 90R3, or 90R5 variants, they may achieve similar or better performance.

While typically 0.01 to 0.2% w/v of T90R4 was added to protein-containing liquids prior to loading liquids onto a DMF device, it will be appreciated that in general, higher concentrations of surfactant will further reduce the rate of protein adsorption (thereby extending device lifetime), but if the concentration is too high, it can lead to hemolysis (lysis of blood cells) in the case of whole blood, or cell toxicity, in the case of cell growth media. The surfactant can also be pre-dried onto a DMF chip for convenience, so that the surfactant is reconstituted automatically in the sample as soon as it is loaded onto the chip.

It is noted that an important concern for blood-based diagnostics is the hemolysis of whole blood specimens. Hemolysis is often undesirable, as it releases otherwise contained intracellular constituents that can interfere with clinical assays. Thus, the inventors tested this effect by mixing phosphate buffered saline (PBS) containing Tetronic 90R4 with ovine whole blood (PBS containing T90R4:blood 1:8) at various final concentrations of T90R4. After these mixtures were incubated at room temperature for 1 hour, the plasma was extracted via centrifugation (500 g/5 min) and the released methemoglobin was determined by measuring the plasma absorbance at 630 nm. As shown in FIG. 6, no appreciable hemolysis was observed for samples supplemented with <0.4% Tetronic 90R4. This confirms the suitability of Tetronic 90R4 as being compatible with non-hemolytic assays in whole blood.

Thus, in conclusion it has been shown that including ethylenediamine tetrakis(ethoxylate-block-propoxylate) tetrol (Tetronic 90R4) as an additive (or pre-coating it on the surfaces) is very advantageous in that it enables the manipulation of high-protein-content solutions (e.g., whole blood), which are otherwise impossible to move for more than a few seconds. The use of this surfactant acts to extend DMF device lifetime for all protein-containing solutions and it is contemplated that this surfactant may be used to reduce biofouling in other systems (e.g., channel and/or 2-phase microfluidics).

Therefore what is claimed is:

1. A system for processing droplets of a fluid containing proteins, the system comprising:

an array of digital microfluidic electrodes; and a surfactant disposable to the array of digital microfluidic electrodes, wherein the surfactant, when disposed to the array, forms a shielding layer at an interface of surfaces of the digital microfluidic electrodes and droplets of the fluid to resist the adsorption of proteins to the digital microfluidic electrodes, wherein a molecular arrangement of the proteins is unchanged by a presence of the surfactant, wherein a molar ratio of the surfactant and the proteins is below 1:1, wherein the system is configured to introduce the droplets of the fluid to the surfactant, and wherein the surfactant has a formula as follows:

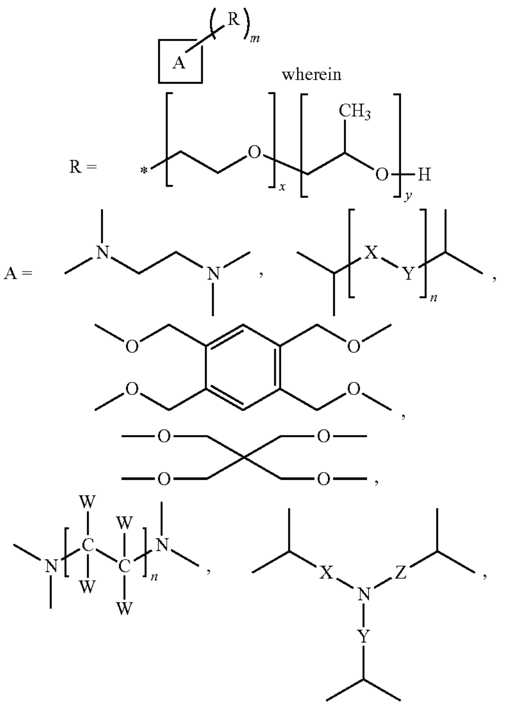

-continued

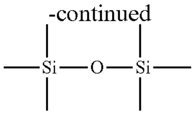

wherein:

x is an integer in a range from 4 to 32, and y is an integer in a range from 2 to 36, m is an integer of 4 or 6 n is an integer of at least 2,

X, Y and Z are any one of the following groups:

I

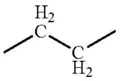

II

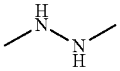

III

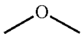

IV

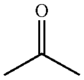

V

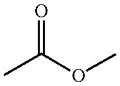

VI

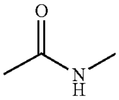

VII

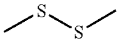

VIII

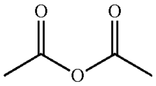

-continued

IX

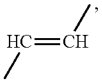

and

W is any one of

—H i

—F ii

—Cl iii iv

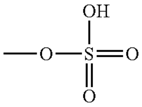

v

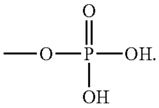

2. The system of claim 1, wherein the surfactant is coated to at least a portion of the array of digital microfluidic electrodes prior to introduction of the droplets of the fluid to the array of digital microfluidic electrodes.

3. The system of claim 1, wherein the droplets of the fluid and the surfactant are mixed prior to introduction of the droplets of the fluid to the array of digital microfluidic electrodes.

4. The system of claim 1, wherein the surfactant is a copolymer that comprises a hydrophilic chain and a hydrophobic chain, wherein the hydrophilic chain is polyethylene oxide (PEO) and the hydrophobic chain is polypropylene oxide (PPO).

* * * * *